C. H. MADDOX.
TIRE ARMOR.
APPLICATION FILED MAR. 1, 1909.
947,834.
Patented Feb. 1, 1910.
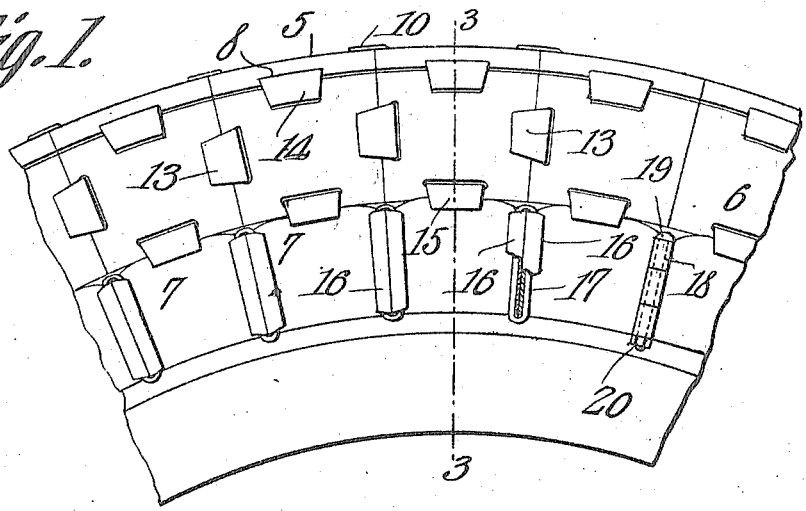
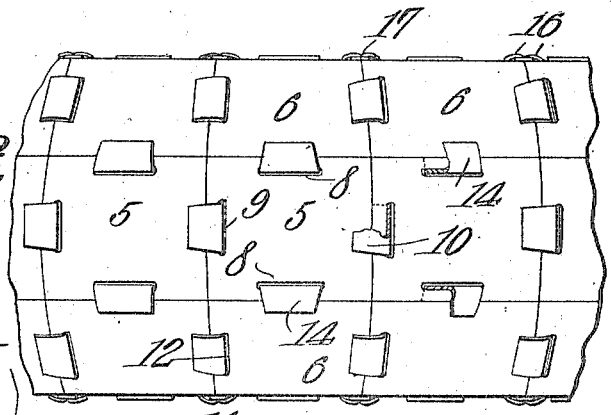
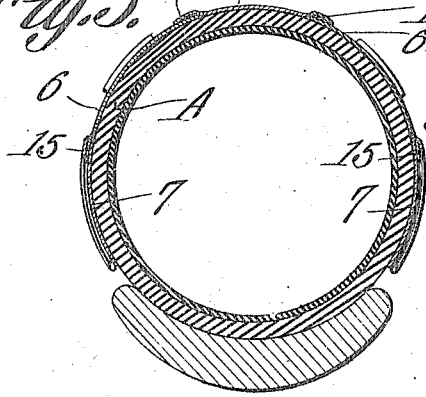
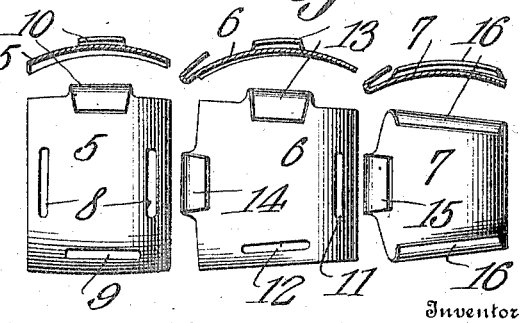
Witnesses
Inventor
Charlie H. Maddox
By C. A. Snow & Co.
Attorneys

UNITED STATES PATENT OFFICE.

CHARLIE H. MADDOX, OF CANTON, MISSOURI.

TIRE-ARMOR.

947,834.

Specification of Letters Patent. Patented Feb. 1, 1910.

Application filed March 1, 1909. Serial No. 480,577.

*To all whom it may concern:*

Be it known that I, CHARLIE H. MADDOX, a citizen of the United States, residing at Canton, in the county of Lewis and State of Missouri, have invented a new and useful Tire-Armor, of which the following is a specification.

It is the object of the present invention to provide an improved construction of tire armor of that class in which the armors are made up of a number of linked plates, which by reason of their peculiar connection one with another, provide for ready application of the armor to the tire and adapt it to readily conform to the contour of the tire when applied thereto.

It is one object of the invention, furthermore, to provide a continuous and practically unbroken protective surface for the tire and this result is accomplished by so forming the plates comprising the armor that their edges will mutually contact at all times.

Other novel features of the invention will be apparent from an inspection of the drawings and also from the specific description which is to follow.

In the accompanying drawings, Figure 1 is a side elevation of a segment of an automobile or similar tire showing the armor embodying the invention applied thereto, parts of the armor being broken away. Fig. 2 is an edge view of the fragment of the wheel showing the armor applied. Fig. 3 is a vertical transverse sectional view through the tire and armor on the line 3—3 of Fig. 1, and Fig. 4 is a group view showing the three types of plates employed in constructing the armor as an entirety.

As is clearly shown in the drawings, the tire armor embodying the invention is comprised of a plurality of series of plates connected in the manner of links and of these armor plates, there are three types, the plates of one type being arranged in an intermediate annular series, the plates of another type being arranged in two series one located to each side of the intermediate series, and the plates of the third type being arranged also in two series and located one series to each side of the plates of the last series.

In the drawings, the tire is indicated by the reference character A, and the plates which comprise the intermediate series are indicated each by the reference numeral 5, the plates which comprise the second mentioned series are indicated each by the reference numeral 6, and the plates which comprise the third mentioned series are indicated each by the reference numeral 7. Each of the plates 5 has its side or lateral edges parallel and is formed with two lateral slots 8 one of which extends in parallel relation with respect to each side edge of the said plates. Each of these plates 5 of the intermediate series is also formed with a slot 9 which extends in a direction at right angles with respect to the direction of extent of the slots 8 first mentioned, and adjacent one end edge of the plate in which it is formed, the said end edges of the plates of the intermediate series being very slightly convex as shown in the group view and the edge view of the drawings. Each of the plates 5 of the intermediate series is formed also with a tongue 10 which is bent back upon itself, as is clearly shown in Figs. 1, 2 and 4 of the drawings, these tongues 10 being located or formed at that end edge of the respective plate 5 opposite the end edge adjacent which the slot 9 is formed.

It will be understood from the foregoing description, that the tongues 10 of the elements 5 engage each with the slots 9 of the next adjacent element 5 and that in this manner, the said plates are connected together in a continuous series. It will be noted from an inspection of the drawings and from the foregoing description that these plates 5 are slightly concavo-convex so as to conform to the tread of the tire and thereby rest flat against the same.

Each of the plates 6 of the second mentioned series has its end edges converging in the direction of its outer lateral edge, the said lateral edge describing substantially a right line, and the opposite or inner lateral edge of these plates 6 is slightly convex as is clearly shown in Fig. 4 of the drawings, and each of the said plates 6 is formed, parallel to its outer lateral edge with a lateral slot 11 and parallel to one of its end edges with a slot 12 and at the other end edge, the plates are formed each with a tongue 13 which is bent upon itself as shown in the drawings and a similar tongue 14 is also provided at the inner lateral edge of the said plates. The tongues 13 of all of the plates 6 are engaged through the slots 12 of the next adjacent plates 6 so that the said plates will be connected in a continuous series, and the tongue 14 of each of the plates 6 engages through one of the lateral slots 8 of the corresponding or adjacent plate 5 so that, the plates of the two series being equal in number, the plates of the second mentioned series are connected each to one of the plates of the first mentioned or intermediate series.

The plates 7 are formed each at the inner lateral edge with a tongue 15 and these tongues are inserted through the lateral slots 11 of the plates 6. The plates of the two series 7 are connected in continuous series by bending their end edges upon themselves as at 16 and inserting the said edges of adjacent plates through elongated links or loops 17 which serve to pivotally connect the plates 7 in a continuous series as stated.

It will be understood of course that while the armor when applied, is in the form of an annulus, it is to be separated at some point in its circumference and a suitable connection provided whereby it may be disposed around a tire to be protected, the clamp being of course closed after such disposal of the armor.

A convenient means for connecting the separated ends of the armor is illustrated to the right in Fig. 1 of the drawings, this means being embodied in suitable sleeve-like lugs 18 which are formed two upon one of the plates 7 and one upon the plate 7 at the other end of the armor, the single lugs fitting between the two first mentioned lugs with its bore in registration with the bores of the two first mentioned lugs, and a bolt 19 which is passed through the three lugs and has threaded upon its end a nut 20 which may be removed to permit of withdrawal of the bolt and separation of the ends of the armor. It will be understood that inasmuch as these lugs 18 are formed only on the plates 7, the connection between the ends of the armor will not be subjected to such considerable strain as it would be if the lugs were formed upon the plates 5 and 6 also.

What is claimed is:—

Tire armor comprising an intermediate series of connected plates, each of the said plates having lateral slots and a slot at one end and a tongue at the other end, the tongues of all of the plates being engaged through the slots at the ends of the next adjacent plates, and series of connected plates arranged to each side of the intermediate series of plates, each of the plates of the last mentioned series being provided with a lateral tongue inserted through the lateral slot at the adjacent side of the corresponding plate of the first mentioned series, each of the plates of each last mentioned series having a tongue at one end and a slot formed at the other end, the tongues of all of the plates of one series being engaged through the slots in the next adjacent plate of the same series, each of the plates of the last mentioned series having a lateral slot, and a series of connected plates arranged one to each side of the last mentioned series, each of the plates of each last mentioned series having a lateral tongue engaged through the lateral slot of the corresponding plate of the series with which it is associated, elongated loops having the end edges of the last series passed therethrough whereby the plates of the said series are connected.

In testimony that I claim the foregoing as my own, I have hereto affixed my signature in the presence of two witnesses.

CHARLIE H. MADDOX.

Witnesses:
F. A. ALBERTY,
JAMES F. McCUTCHAN.